Figure 1:
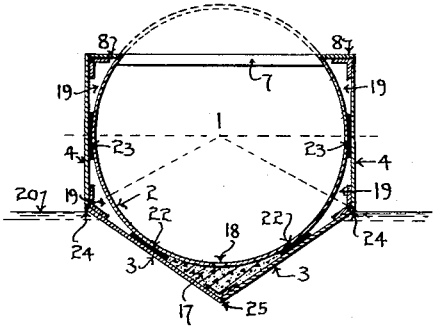

Nov. 20, 1934.   H. M. KNIGHT   1,980,998

VESSEL

Filed July 7, 1931   5 Sheets-Sheet 1

INVENTOR
HERBERT M. KNIGHT
BY
Howard P. Kiria
ATTORNEY

Nov. 20, 1934.  H. M. KNIGHT  1,980,998
VESSEL
Filed July 7, 1931  5 Sheets-Sheet 2

INVENTOR
HERBERT M. KNIGHT
BY
Howard P. King
ATTORNEY

Nov. 20, 1934.  H. M. KNIGHT  1,980,998
VESSEL
Filed July 7, 1931   5 Sheets-Sheet 3

INVENTOR
HERBERT M. KNIGHT
BY
Howard P. King
ATTORNEY

Nov. 20, 1934.  H. M. KNIGHT  1,980,998
VESSEL
Filed July 7, 1931    5 Sheets-Sheet 4

INVENTOR
HERBERT M. KNIGHT
BY
Howard P. King
ATTORNEY

Nov. 20, 1934.                    H. M. KNIGHT                    1,980,998
                                    VESSEL
                        Filed July 7, 1931        5 Sheets-Sheet 5

INVENTOR
HERBERT M. KNIGHT
BY
Howard P. King
ATTORNEY

Patented Nov. 20, 1934

1,980,998

UNITED STATES PATENT OFFICE 1,980,998

VESSEL

Herbert M. Knight, Upper Montclair, N. J.

Application July 7, 1931, Serial No. 549,138

13 Claims. (Cl. 114—79)

This invention has reference to improvements in vessels and is more specifically related to vessels of small size and inferior quality, such as barges, lifeboats and similar craft.

One of the objects of this invention is the production of boats in which a plurality of frames is dispensed with and a single frame extending substantially from prow to stern is substituted for such plurality of frames. Another object of the invention is the production of a class of craft in which prows and sterns are substantially similar, and which the mid-section may be varied as regards length, thereby standardizing and economizing construction. Another object of the invention is the production of a craft in which the skin is composed of plates in planes, and the shell of plates of a curvilinear form. Another object of the invention is the construction of a craft in which air-cells are automatically created between the skin and the shell. A further object of the invention is the construction of non-sinkable craft in which the constant flotation is secured by means of air-pockets created between the skin and the shell. Still another object of the invention is the construction of craft composed of a multiple of such non-sinkable vessels connected to each other along longitudinal lines. Another object of the invention is the construction of craft composed of an outer skin and an inner shell, with bilge-keels connected to both said skin and shell. A further object of the invention is the construction of crafts in which the plates of either or both skin and/or shell are crimped at joints or similar points, thereby assisting in the connection together of said skin and shell, and also strengthening the structure. Still another object of the invention is the construction of craft in which the keel passes through, and is connected to both the skin and the shell. Another object of the invention is the construction of a craft in which a permanent ballast may be cast between the skin and the shell. Still another object of the invention is the construction of a craft in which the riveting of the plates is largely or entirely dispensed with, the skin and shell being connected together at points of contact by means of welding. Still other objects of the invention will be disclosed by the following description and by the accompanying drawings.

The accompanying drawings illustrate the usual and preferred embodiment of the invention, but are not to be considered as including and covering all forms in which the invention may be embodied, nor as excluding those forms not specifically shown.

Figure 2:
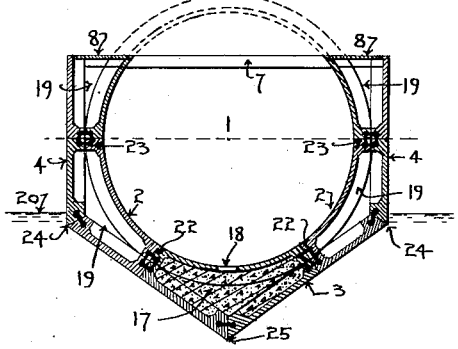
Figure 3:
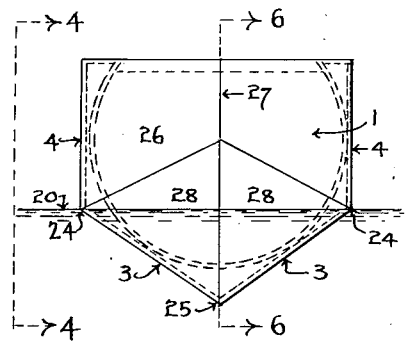
Figure 4:
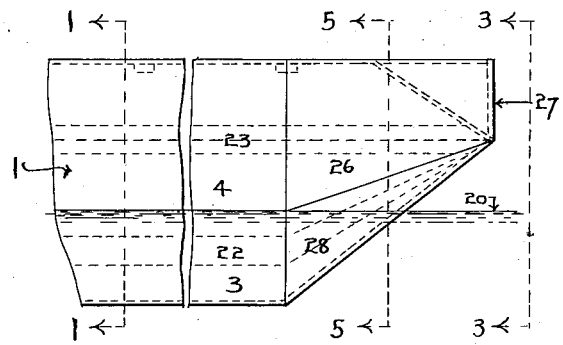
Figure 5:
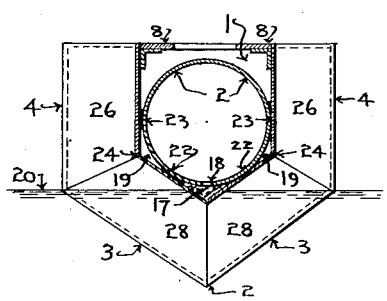
Figure 6:
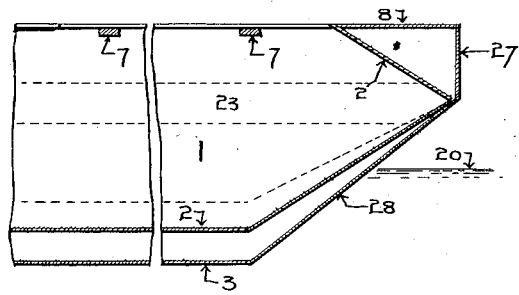
Figure 7:
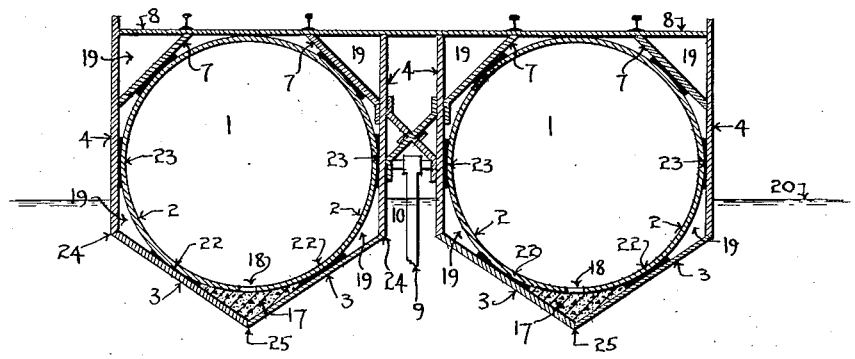
Figure 8:
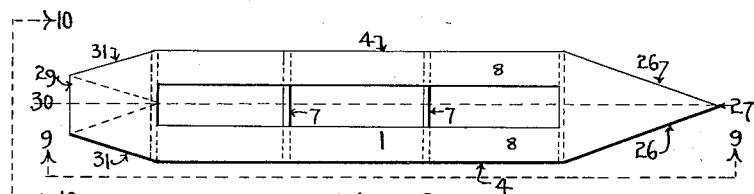
Figure 9:
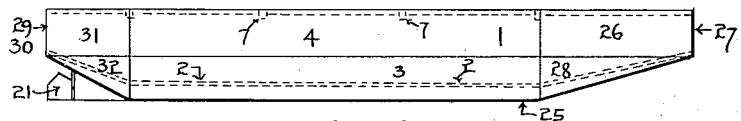
Figure 10:
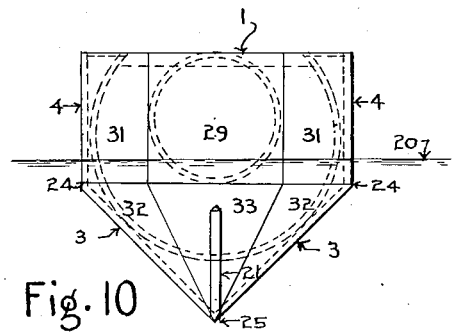
Figure 11:
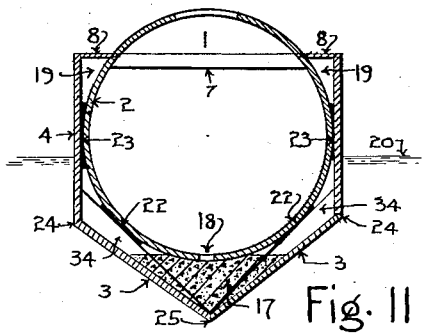
Figure 12:
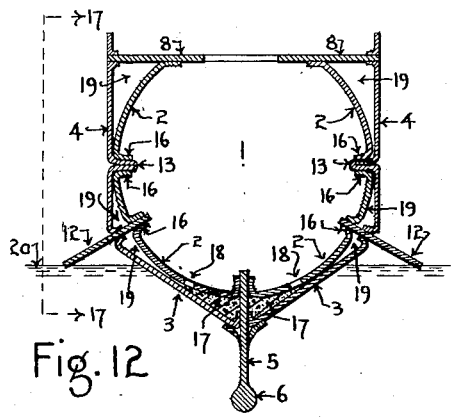
Figure 13:
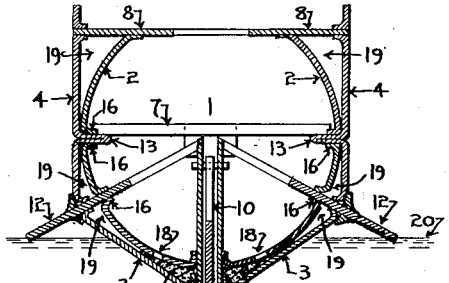
Figure 14:
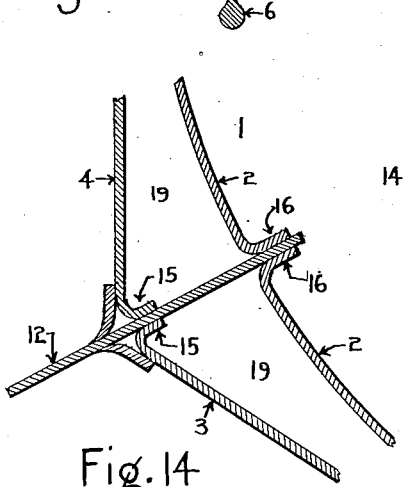
Figure 15:
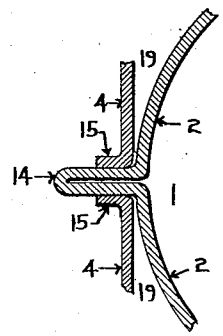
Figure 16:
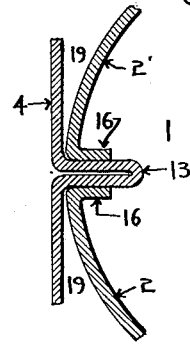
Figure 17:
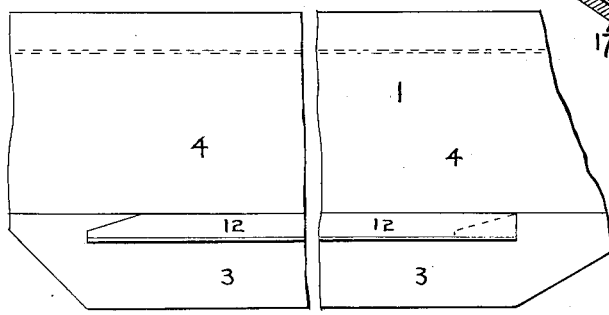
Figure 18:
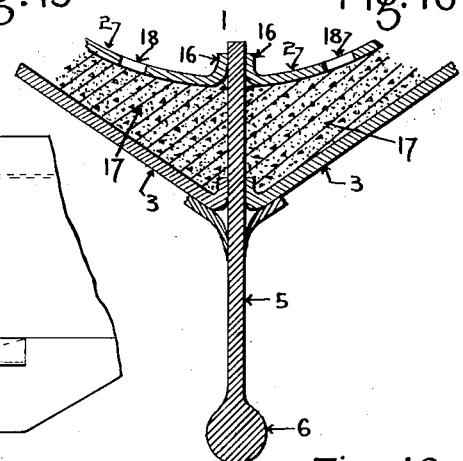
Figures 19, 20:
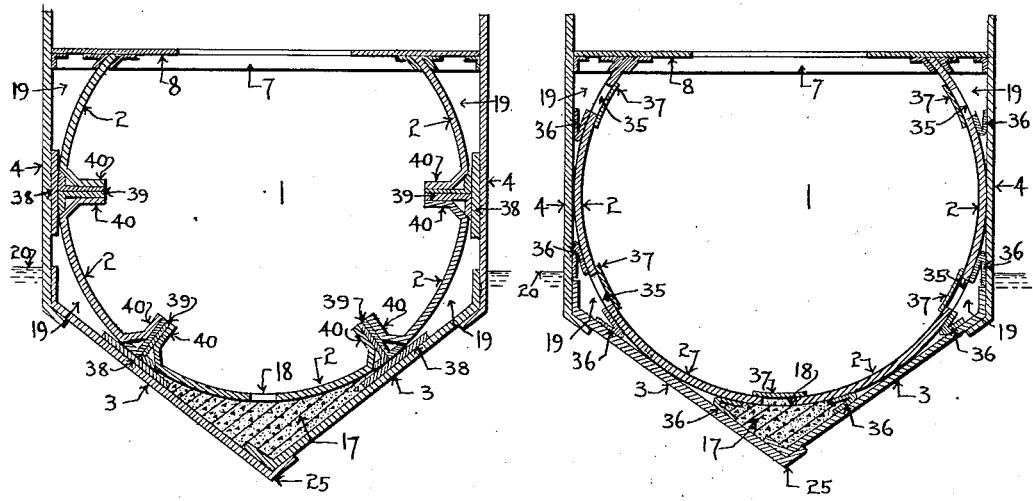
Figure 21:
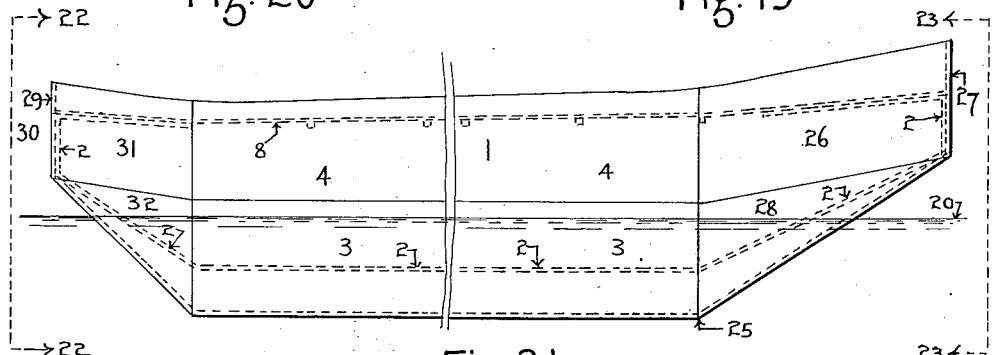
Figure 22:
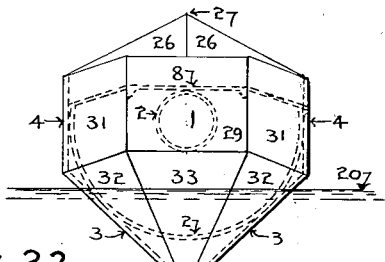
Figure 23:
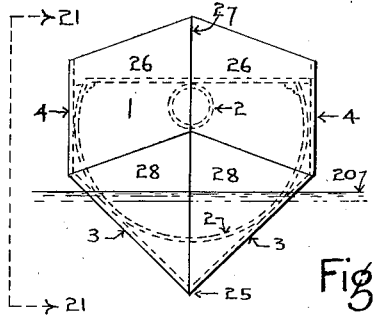
Figure 24:
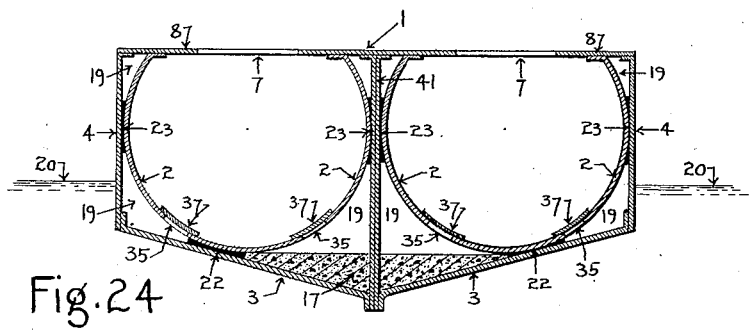
Figure 25:
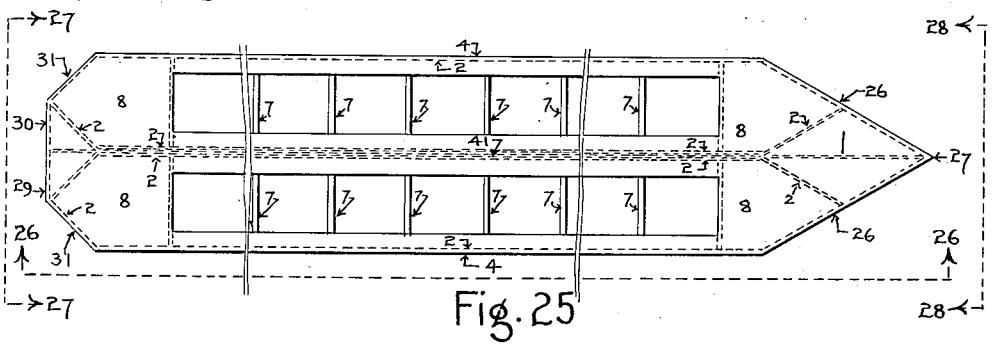
Figure 26:
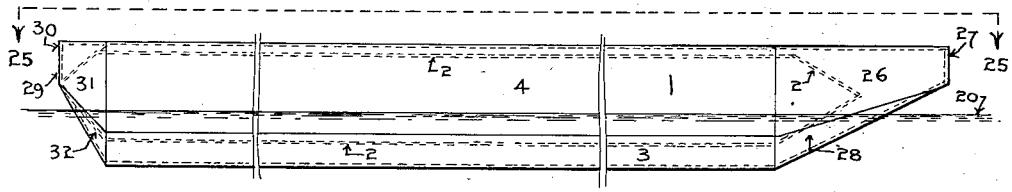
Figure 27:
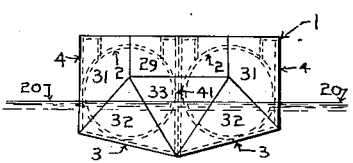
Figure 28:
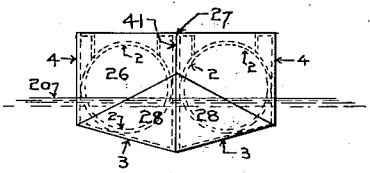

I illustrate my invention by the accompanying drawings in which Fig. 1 is a cross-section of a craft at or about mid-ship section; Fig. 2 is a similar cross-section, in a case where the vessel is constructed of thicker plates, such as pre-cast concrete. Fig. 3 is an elevation of the prow of such a vessel on the line 3—3 of Fig. 4. Fig. 4 is a longitudinal elevation of a vessel on the line 4—4 of Fig. 3. Fig. 5 is a cross-section of a vessel near the prow on the line 5—5 of Fig. 4. Fig. 6 is a longitudinal section on the line 6—6 of Fig. 3. Fig. 7 is a mid-ship section of a multiple unit vessel of the catamaran type. Fig. 8 is a plan view of the type of the vessel illustrated. Fig. 9 is a longitudinal elevation on the line 9—9 of Fig. 8. Fig. 10 is a stern view on the line 10—10 of Fig. 8. Fig. 11 is a mid-ship section of a unit in which the inner shell rests on ribs instead of upon the outer skin. Fig. 12 is a mid-ship section of a vessel showing the construction in which crimped plates are employed in connection with bilge-keels. Fig. 13 is such a mid-ship section in a craft where a centre-board is used. Fig. 14 is a section at the bilge-keel of such craft. Fig. 15 is a section of a joint showing a connection when the shell plating is crimped and Fig. 16 is a section of a joint when the skin plating is crimped. Fig. 17 is a side elevation on the line 17—17 of Fig. 12, showing the bilge-keel and Fig. 18 is a cross-section at the keel of such a craft showing the jointing of the plates and keel and the permanent ballast. Fig. 19 is a mid-ship section showing the employment of bent welding plates and Fig. 20 is such a section showing the employment of welding connection plates made up of plates and angles. Fig. 21 is a longitudinal elevation of a vessel on the line 21—21 of Fig. 23. Fig. 22 is a stern elevation on the line 22—22 of Fig. 21 and Fig. 23 a bow elevation on the line 23—23 of Fig. 21, these elevations illustrating the application of these improvements to vessels where a sheer is demanded. Fig. 24 is a mid-ship section of a vessel having multiple internal framing. Fig. 25 is a plan view of such a vessel on the line 25—25 of Fig. 26. Fig. 26 is a longitudinal elevation of such a vessel on the line 26—26 of Fig. 25. Fig. 27 is a stern elevation of such a vessel on the line 27—27 of Fig. 25 and Fig. 28 is a bow elevation of such a vessel on the line 28—28 of Fig. 25.

Referring to the drawings in which similar figures refer to similar parts, 1 is a vessel consisting of an inner shell 2, bottom skin-plates 3 and side skin-plates 4. A keel 5, extends downwardly and a bulb 6, is located at the bottom thereof. Braces 7, and floor-plates 8, serve as stays to said skin and shell. A centre-board 9, is located in a well 10, medially longitudinally of said craft. Crossbraces 11, serve to unite and hold multiple units composed of said shells and skins. Bilge-keels 12, pass through said skin. Crimps 13, are formed in said skin, and crimps 14, in said shell-plates. Flanges 15, are formed in said skin, and 16, in said shell-plates. Permanent ballast 17, is poured between said skin and said shell, through apertures 18. Air-pockets 19, are formed between said skin and said shell. The surface of the water is indicated at 20, and 21 indicates a rudder. Connection points 22, are located at points of contact of said shell and said bottom skin-plate, and connection points 23, are located at points of contact of said shell and said side skin-plates. Connection points 24, are located at points of junction of said side skin-plates and said bottom skin-plates, and connection points 25, are located at points of junction of said bottom skin-plates. Side prow skin-plates 26, extend from the prow 27, to the side skin-plates 4, and bottom prow skin-plates 28, extend from said prow 27, to said bottom skin-plates 3. Side stern skin-plates 29, are at the stern 30, of said vessel. Angular side skin-plates 31, extend from said stern skin-plates 29, to said side skin-plates 4, and inclined bottom skin-plates 32, extend from said angular side skin-plates 31, to said bottom skin-plates 3, and an inclined bottom stern skin-plate 33, extends from said stern plate 29, to said inclined bottom skin-plate 32. Ribs 34, are spaced along said bottom skin-plate and serve, where introduced, to support said shell. Openings 35, in said shell give access to said air-pockets and permit operation in connection with strips 36. Cover-plates 37, seal said openings. Longitudinal plates 38, are attached to said skin. Angles 39, connect said plates and fillets 40, on said shell. A longitudinal bulkhead 41, is located between and connected to multiple shells.

Boats and other vessels as usually constructed are composed of a series of internal ribs or frames, spaced fairly closely together, and variously shaped to correspond with the varying exterior form of the craft, and an outer skin, overlaying and connected to this internal system of frames. The construction of such a vessel is both long and difficult and requires a maximum of skill in the shaping and bending of the ribs, and in the laying on and attachment of the exterior skin. Usually a single layer of wood or metal is placed on the exterior edges of the internal frame, but occasionally an inner shell is placed on the interior faces of the ribs and thereby a cellular type of construction results, an annular air space being created between the outer skin and the inner shell extending from the keel along the aforesaid ribs. On account of the varying and complicated lines of curvature which make up the hulls of vessels as usually designed, the bending of the frames and the laying down of the strakes is both complicated and expensive, requiring a maximum of care and skill in their proper execution, and that without creating a vessel of maximum lightness and safety. And yet the system has been so long and firmly established as to make any other system seem wildly revolutionary. Even in smaller vessels, and even in the case of those constructed wholly or largely of wood, the framing of the frames and the placing of the skin so as to produce a structure having fine lines, represents a difficult and highly artistic operation.

In the case of vessels in which fineness of lines is not essential or is of less importance, refinement of curvature or line, may be dispensed with, but the usual practice is still the same, viz:— that of a system of interior frames, on the exterior edges of which is superimposed a skin of wood or metal. In the case of vessels of large beam the stresses are quite severe, demanding a system of interior trusses to carry these loads and stresses from the usually flat bottom to the sides and the frames.

This invention overcomes all of the above mentioned difficult and complicated processes and operations, by eliminating the ribs, or frames, constructing the vessels with an outer skin composed of plates in planes, and an interior shell, usually curvilinear and unparallel with said outer skin. Both the outer skin and inner shell are composed of plates, usually quite thin, and of only sufficient thickness to meet the necessities of imperviousness and strength. These two integral portions of the structure are not parallel in a plane normal to the longitudinal axis of the vessel at any point, the effort being to create a structure in which the skin and shell shall not be in parallel, or in continuous contact, but one in which these two important features shall be in contact, and be united together, at points of tangency only.

Again the interior shell acts as the strengthening frame, in a manner similar, but superior to, the ribs of vessels as usually constructed, and, because of such shell being continuous, or nearly continuous, from prow to stern, and because the connections to the skin are likewise continuous, or nearly continuous, a structure results in which both the skin and the shell act as one to resist all stresses, strains or impacts, and an unusually strong craft results.

As has previously been recited the exterior skin is made up of plates which are planes. These plates are rectilinear both vertically and horizontally, all exterior curves being eliminated. But these skin-plates are disposed not only in a vertical or horizontal plane, certain of the planes being inclined and certain being triangular in shape to meet the special conditions made necessary by prow and stern construction. The shape illustrated and preferred consists of vertical upper side-plates, the lower edges of which said plates are attached to the bottom plates, the line of juncture being usually horizontal. These bottom plates are likewise planes and are inclined to the vertical, extending from the side-plates to the centre of the vessel, at which point they are either attached to the keel, or, in the absence of a distinct keel, are connected to each other. At no point are these bottom plates curvilinear, as usually constructed, and the bottom of the craft, instead of being flat, is wedge shaped in section, as a result of the inclination of the oppositely disposed bottom skin-plates.

The interior shell is curvilinear as opposed to the plane surfaces of the outer skin. Naturally as a result of these two forms of skin and shell there are only single points of contact as between each skin-plate and the shell, such contact points occurring at the points where the skin is tangent to the shell. This fact is taken advantage of as continuous jointing means which materially assist in increasing the strength of the vessel, these longitudinal contact jointings creating continuous longitudinal beams, and likewise acting to so join the shell and the skin that a cellular girder results, and all parts of the structure, both skin and shell, act together in resisting stresses and shocks.

One of the economical features of this type of construction is the fact that the shell is of uniform diameter of curvature throughout nearly the entire length of the vessel, only being reduced at the stern and prow sections, where, on account of the converging side plates, a less diameter of shell is demanded.

The type of jointure, both of the side and bottom plates, and of the several plates, as also the joining of the skin and shell, is a welded joint, preferably electrically welded. While the plates and the skin and shell could be joined together by riveting, welding is much superior, producing a joint of greater strength, and one more satisfactory from the standpoint of leakage, and at the same time a smoother joint, and one offering less resistance in the water, results. While the drawings illustrate welded joints, it is not to be assumed that riveted, or other means of jointure and attachment are excluded.

It is apparent that vessels so constructed will be very light and can be built of comparatively very light gage metal, as the arrangement is such as to utilize to a maximum extent the entire strength of such metal. The consequent result is that, without special provision in opposition, the centre of gravity will be comparatively high, which, in the event of a disturbance of the craft might produce either unstable or neutral equilibrium. As a partial means of correcting such an undesirable condition, on the larger boats of this type, resort is had to bilge-keels. The form of cross-section and the method of construction adapts itself easily and logically to such bilge-keels, said keels passing diagonally through the skin and shell at the point of meeting of the side and bottom plates. Such a bilge therefore becomes a diaphragm, uniting the skin and the shell and constituting an additional longitudinal girder. At the same time it introduces a stronger joint at the contact points of sides and bottom plates and also aids the shell by reducing the clear superficial area thereof, and, by means of fillets the welding is strengthened and a more rigid structure results. Furthermore the bilges can be continued to the central portion of the vessel by struts or braces and the whole vessel tied together with a maximum resultant strength.

It has been heretofore recited that it is possible to use metal of minimum gage in the construction of this type of vessel, and such minimum gage may be combined with the use of light weight alloys, such as duralumin. The resistance of such light material to stresses and shocks is greatly increased, and also the welding features improved by folding the plates back upon themselves, in a crimp, at the several points of contact and juncture. This crimping results in a rib being formed longitudinal of the vessel, at the joints, or at points between, as the size of the surfaces, or the necessities of the case, may dictate. The crimping of the plates, besides strengthening the same, simplifies construction, forming, as it does, a surface against which either skin or shell plates may be bent to a bevel, and the bent portion joined to the crimp by welding, (as indicated), riveting, or otherwise.

As previously recited the centre of gravity of such a light craft as is herein indicated, is liable to be so high as to produce a condition of unstable equilibrium. As a partial means of counteracting this possibility, and in order to lower, as far as possible the centre of gravity, a permanent ballast is introduced in the annular space between the skin and shell at the lowest point, adjacent to the keel. This permanent ballast is usually made of concrete of a very heavy constituent mixture. This concrete is introduced through openings designedly left for this purpose in the lower part of the shell. By this means, and by regulating both the amount and the consistency of the concrete, the position of the centre of gravity may be regulated at will.

Inferior vessels, such as car-floats, barges, etc., which are not subjected to heavy seas or high winds, when constructed by the method herein described, and by the use of inclined bottom plates, can be constructed without any definite keel, the entire triangular bottom of the vessel, in a manner acting as a keel. In such cases, of course, the inclined bottom plates are securely fastened together by welding or other means. When however a craft is liable to the stress of sea and wind, both for the purpose of strength and in order to maintain courses, some form of keel is required. This keel may be a fixed keel, rigidly attached to the bottom plates and to the shell, and may pass through both said skin and shell, as in the case of bilge-keels, or it may take the form of a centre-board which may be lowered or raised within a well in the centre of the craft, to meet changes in depth or draft.

Craft of the type described, admit of construction in multiple, being joined in plurality together rigidly by braces. The units of such plurality may be similar in all details, as regards form and dimension, or the units may vary in these regards as the conditions warrant or require. This method of employing multiple units to produce a craft is applicable to the construction of pontoons, car-floats, and similar craft, and to a type of vessel known as a "catamaran".

In the case of wide craft of comparatively shallow depth, the design is modified, combining a multiple of interior shells (usually two), the exterior surfaces of which shells are in contact with the interior surfaces of the exterior skin-plates, and the opposite sides of which said shells are in contact with a central longitudinal bulkhead. This form of construction is one of exceptional strength. This latter design may be still further modified by eliminating the central longitudinal bulkhead, the shells being in contact with, and connected to each other.

In the case of larger vessels it may become necessary or desirable to use some form of contact connection as between the shell and the skin, other than a simple riveted or welded joint. In such cases either a continuous or nearly continuous bent strip is employed at the point of juncture, giving large and numerous contacts and at the same time providing a series of longitudinal strengthening bars, materially increasing the strength of the vessel. Another means of accomplishing the same end is secured by employing a combination of plates and angles at the division points of the shell, to which the shell is attached by means of a bent portion of the shell-plate, such as a lug.

While this type of construction is better adapted to use in connection with craft having little or no sheer, it is nevertheless adaptable to vessels in which sheer is an important element. Where so applied the side-plates, especially at stern and prow, become rhomboids instead of rectangles, the number and position of such oblique angled plates determining the fineness and appearance of the vessel.

In certain cases it may be desirable or necessary to support the shell above the bottom plates, in which event, ribs are introduced, resting upon and attached to the inclined bottom plates. The shell plates are then supported by, and attached to, the upper surfaces of these ribs. A larger air-pocket is thereby created in the bottom of the vessel, and in addition a larger amount of permanent ballast may be introduced, resulting in a lowering of the centre of gravity.

It is at once evident that the system of design and construction described, admits of very rapid and economical assembling. Plates can be cut to size, and bent to definite curvature in great quantities and in advance of requirements, and the installation and fastening in position is both simple and rapid. The necessity for templates and mold-lofts is eliminated, and launching ways can be materially simplified. The entire process of building vessels can be reduced to fewer, and to a minimum of operations, expediting, as well as simplifying, construction, resulting in better vessels at less cost.

What I claim, is:—

1. A vessel composed of a plurality of units, said units being composed of an outer skin, an inner shell, said shell extending longitudinal and continuous of said unit, said skin and said shell being unparallel relative to each other transversely of said unit, said skin and said shell being connected to each other and means joining said units together in a position longitudinally parallel relative to each other.

2. In a vessel, the combination of an outer skin, said skin being a series of planes, an inner frame, said frame being composed of a multiple of shells, said shells being curvilinear in a plane normal to the longitudinal axis of said vessel, points of contact of said skin and said frame, means joining said skin and said frame, said shells having tangential points of contact and means joining said shells at said points.

3. In a vessel, the combination of an outer skin, an inner shell, said skin and said shell being unparallel relative to each other in a plane normal to the longitudinal axis of said vessel and bilge-keels passing through said skin and said shell and connected to said skin and shell.

4. In a vessel, the combination of an outer skin, said skin being a series of adjacent planes obliquely disposed relative to each other and disposed as side plates and bottom plates, an inner shell, said shell being curvilinear in a plane normal to the longitudinal axis of said vessel and extending continuously longitudinally of said vessel, said skin and said shell having lines of contact, and means directly securing said skin and said shell together at said lines.

5. In a vessel, the combination of an outer skin, said skin being made up of planes disposed as upper strakes, substantially vertical, and lower strakes obliquely disposed relative to said upper strakes, an inner shell, said shell being curvilinear in a plane normal to the longitudinal axis of said vessel, and extending continuously longitudinally of said vessel, said skin and said shell having lines of contact, and means directly securing said skin and said shell together at said lines.

6. A vessel, comprising a prow section, a waist section, and a stern section, each of said sections being composed of an outer skin, said skin being made up of planes disposed as upper strakes, substantially vertical, and lower strakes obliquely disposed relative to said upper strakes, a longitudinal inner shell, curvilinear in a plane normal to the longitudinal axis of said vessel, said shell being continuous of said vessel, each said section having lines of contact between the skin and shell, and means directly securing said skin and said shell at said lines.

7. In a vessel, the combination of an outer skin, said skin being made up of planes disposed as upper strakes, substantially vertical, and lower strakes, obliquely disposed relative to said upper strakes, an inner shell, said shell extending continuously longitudinally of said vessel, said shell being curvilinear in a plane normal to the longitudinal axis of said vessel, said skin and said shell having lines of contact, means directly securing said skin and said shell together at said lines, and bilge keels connected to said skin.

8. A vessel comprising a plurality of units, each of said units being composed of an outer skin, said skin being a series of planes obliquely disposed relative to each other, an inner shell, said shell being curvilinear and extending longitudinally and continuously of said units, said skin and said shell being connected to each other, and means joining said units together in a position longitudinally parallel relative to each other.

9. In a vessel, the combination of an outer skin, said skin being a series of planes obliquely disposed relative to each other and disposed as side plates and bottom plates, an inner shell, said shell being curvilinear in a plane normal to the longitudinal axis of said vessel and extending longitudinally of said vessel, said skin and said shell having lines of contact, means connecting said skin and said shell, and a fin-keel connected to said bottom plates at the point of intersection of said bottom plates.

10. In a vessel, the combination of an outer skin, an inner shell, said skin and said shell being unparallel relative to each other in a plane normal to the longitudinal axis of said vessel, said skin being disposed as side-plates and bottom plates, said bottom plates being angularly disposed relative to each other, and triangular ribs transverse of said vessel resting upon and connected to said bottom plates, said shell and said ribs having lines of contact and means connecting said shell and said ribs at said lines.

11. In a vessel, the combination of an outer skin, said skin being a series of planes obliquely disposed relative to each other and disposed as side plates and bottom plates, an inner shell, said shell being curvilinear in a plane normal to the longitudinal axis of said vessel and extending longitudinally of said vessel, crimps in said shell extending outwardly and through said skin, and means connecting said skin and said crimps.

12. In a vessel, the combination of an outer skin, said skin being a series of planes obliquely disposed relative to each other and disposed as side plates and bottom plates, an inner shell, said shell being curvilinear in a plane normal to the longitudinal axis of said vessel and extending longitudinally of said vessel, crimps in said skin extending inwardly and through said shell, and means connecting said shell and said crimps.

13. In a vessel, the combination of an outer skin, said skin being made up of planes disposed as substantially vertical upper strakes, and lower strakes obliquely disposed relative to said upper strakes and to abutting lower strakes, an inner shell, said shell being curvilinear in a plane normal to the longitudinal axis of said vessel and extending continuously longitudinally of said vessel, said skin and said shell having lines of contact, means connecting said skin and said shell at said lines, said skin and said shell providing a space between said shell and said obliquely disposed lower strakes and a permanent ballast in said space.

HERBERT M. KNIGHT.